(12) United States Patent
Alpert et al.

(10) Patent No.: US 8,148,460 B2
(45) Date of Patent: Apr. 3, 2012

(54) AUXILIARY LIQUID RHEOLOGICAL MEDIUM, METHOD FOR THE PRODUCTION AND USE THEREOF

(75) Inventors: Christina Alpert, Münster (DE); Heinz-Peter Rink, Münster (DE)

(73) Assignee: BASF Coatings GmbH, Munster (DE)

( * ) Notice: Subject to any disclaimer, the term of this patent is extended or adjusted under 35 U.S.C. 154(b) by 177 days.

(21) Appl. No.: 10/595,190

(22) PCT Filed: Sep. 21, 2004

(86) PCT No.: PCT/EP2004/052348
§ 371 (c)(1),
(2), (4) Date: Mar. 22, 2006

(87) PCT Pub. No.: WO2005/033166
PCT Pub. Date: Apr. 14, 2005

(65) Prior Publication Data
US 2007/0203268 A1 Aug. 30, 2007

(30) Foreign Application Priority Data

Oct. 4, 2003 (DE) ................... 103 46 157

(51) Int. Cl.
*B01F 3/00* (2006.01)
*C08G 18/00* (2006.01)
*C08G 18/08* (2006.01)
*C08G 18/10* (2006.01)
*C08G 18/22* (2006.01)
*C08G 18/32* (2006.01)
*C08G 18/60* (2006.01)
*C08J 3/00* (2006.01)
*C08K 3/20* (2006.01)
*C08K 5/00* (2006.01)
*C08L 75/00* (2006.01)

(52) U.S. Cl. ............. 524/589; 252/363.5; 524/211; 528/44; 528/55; 528/61; 528/68

(58) Field of Classification Search ............... 524/589, 524/211; 252/363.5; 528/44, 55, 61, 68
See application file for complete search history.

(56) References Cited

U.S. PATENT DOCUMENTS

| | | | | |
|---|---|---|---|---|
| 4,540,734 A | * | 9/1985 | Short et al. | 524/507 |
| 5,064,871 A | * | 11/1991 | Sciangola | 521/124 |
| 5,204,401 A | * | 4/1993 | Anderson et al. | 524/441 |
| 7,019,042 B2 | * | 3/2006 | Rockrath et al. | 522/78 |
| 2003/0170395 A1 | | 9/2003 | Highcock et al. | |

FOREIGN PATENT DOCUMENTS

| | | |
|---|---|---|
| DE | 2359129 A1 | 6/1974 |
| DE | 2360019 A | 6/1974 |
| DE | 2359123 A1 | 6/1975 |
| DE | 2751761 C2 | 9/1982 |
| DE | 19725188 A1 | 6/1998 |
| DE | 19924170 A1 | 5/1999 |
| DE | 19811471 A1 | 9/1999 |
| DE | 10042152 A1 | 8/2000 |
| DE | 19924171 A1 | 11/2000 |
| DE | 19924172 A1 | 11/2000 |
| DE | 10126647 A1 | 12/2002 |
| EP | 0192304 B1 | 8/1988 |
| EP | 0376674 A1 | 4/1990 |
| WO | W09422968 A1 | 10/1994 |
| WO | WO9840170 A1 | 9/1998 |
| WO | WO0037520 A1 | 6/2000 |

OTHER PUBLICATIONS

International Preliminary Report on Patentability for PCT/EP2004/052348 dated Oct. 2, 2006.

* cited by examiner

*Primary Examiner* — Patrick Niland
(74) *Attorney, Agent, or Firm* — Cantor Colburn LLP

(57) ABSTRACT

A liquid rheological aid comprising at least one urea derivative preparable which is the reaction product of at least one compound having at least one isocyanate group and at least one co-reactant selected horn primary and secondary monoamines and polyamines and water reacted in the presence of organobismuth catalyst, process for the preparation thereof and its use.

26 Claims, No Drawings

US 8,148,460 B2

AUXILIARY LIQUID RHEOLOGICAL MEDIUM, METHOD FOR THE PRODUCTION AND USE THEREOF

CROSS REFERENCE TO RELATED APPLICATIONS

This application is a National Phase Application of PCT/EP2004/052348, filed 21 Sep. 2004, which claims priority to DE 10346157.4, filed 4 Oct. 2003.

FIELD OF THE INVENTION

The present invention relates to novel liquid rheological aids. The present invention also relates to a new process for preparing liquid rheological aids. The present invention relates not least to the use of the new liquid rheological aids and of the liquid rheological aids prepared by the new process, especially for preparing coating materials, adhesives, and sealants.

BACKGROUND OF THE INVENTION

Following their application, coating materials are required to display great steadfastness, so as to allow the production of comparatively thick coating films and coating systems, without this leading to extremely disruptive running, especially on vertical substrates.

"Running" is the term for the sagging of applied coating materials on vertical or inclined surfaces, producing an unattractive appearance in the resultant coatings. Where this run phenomenon occurs across a relatively large area, it is also called "curtaining". In general a distinction is made between runs at edges, angles, and holes (initiator points) and the extensive sagging of coatings on surfaces, which is also called "slipping". The reason for the formation of runs may lie in an incorrect composition or in incorrect application of coating material. The quantity indicated as the "run limit" is generally the dry film thickness of the applied coating material, in μm, above which the first runs occur following spray application of said material to a perforated, vertical metal panel (cf. in this respect also Römpp-Online 2002, "running", "run limit", and "curtaining"). The dry film thickness or dry coat thickness of the applied coating material above which the running phenomena described occur on vertical or inclined surfaces is generally referred to as the "stability limit".

In practice these running phenomena constitute a serious problem, since in the industrial coating of three-dimensional substrates of complex shape, especially in the case of automotive OEM finishing, they lower operational reliability and raise the reject rate. For instance, in connection with the finishing of automobile bodies, there is a risk that the films built up in electrostatic spay application (ESTA) on sharp edges of the bodies will be too thick. If their thickness exceeds the stability limit of the coating material in question, the disruptive running phenomena will occur in the course of further processing, particularly during drying and thermal curing. On the other hand, the viscosity of the coating materials must not be so high that problems occur during application and it is no longer possible for the applied coating films to flow out effectively.

These problems occur to an increased extent with coating materials, especially clearcoat materials, having a high solids content, which are also referred to by those in the art as "high-solids clearcoat materials". The use of coating materials of high solids content, especially high-solids clearcoat materials, is advantageous on environmental grounds, though, since their emissions of volatile organic materials in the course of application in curing are lower. At the same time these coating materials as well must provide coating systems, especially clearcoats, which in terms of their gloss, transparency and clarity, scratch resistance, weathering stability, and yellowing resistance satisfy all of the demands of the market.

This problematic behavior in these coating materials, especially in the high-solids clearcoat materials, arises from the fact that they are required, despite having a low solvent content, to be of low viscosity, in order to be able to be applied easily by spray application. This implies, however, that, unlike coating materials having higher solvent contents, the increase in viscosity occurring as a result of evaporation during spray application can only be small. This makes it fundamentally necessary to provide them with rheological aids.

Comparable problems also occur with adhesives and sealants, especially those having a high solids content.

Rheological aids for setting a pseudoplastic behavior (cf. Römpp Lexikon Lacke und Druckfarben, Georg Thieme Verlag, Stuttgart, New York, 1998, "Pseudoplasticity", page 546) and pseudoplastic coating materials comprising them have been known for a long time. In particular the rheology of coating materials can be positively influenced using liquid rheological aids comprising crystalline urea derivatives. These rheological aids, often also referred to as thixotropic agents, are prepared, familiarly, in situ from polyisocyanates and amines in the presence of additives. By way of example, reference may be made in this respect to the German published laid-open specifications and patent applications and to the German patent DE 23 60 019 B 2, DE 23 59 9123 B 1, DE 23 59 129 B 1, DE 198 11 471 A 1, DE 27 51 761 C 2, DE 199 24 170 A 1, DE 199 24 172A 1, DE 199 24 171 A 1, DE 100 42 152A 1, DE 101 26 647A 1 or DE 101 26 648 A 1, to European patent EP 0 192 304 B 1 or to international patent applications WO 94/22968 A 1 and WO 00/37520 A 1.

These known, liquid rheological aids, however, contain the crystalline urea derivatives only in an amount of up to 10% by weight, based on a rheological aid. This means, though, that a comparatively large amount of liquid rheological aid must be incorporated into the coating materials, particularly into the high-solids clearcoat materials, in order to obtain an amount of crystalline urea derivatives sufficient for positively influencing the rheology. As a result of the comparatively large amount of liquid rheological aid, however, the solids content of the coating materials is undesirably lowered.

Attempts have been made to counter this problem by raising the amount of crystalline urea derivatives in the known, liquid rheological aids. In the majority of cases, however, this results in the liquid rheological aids in question being barely still fluid and therefore subsequently being difficult if not impossible to process.

It is an object of the invention to provide novel liquid rheological aids which comprise at least one urea derivative and at least one additive and which no longer have the disadvantages of the prior art but instead, even with a urea derivatives content of more than 10% by weight, based on the novel liquid rheological aid, are easy to prepare, are fluid, and are easy to process.

The novel liquid rheological aids ought to allow greater amounts of coating materials, adhesives and sealants, especially high-solids clearcoat materials, to be treated than with the same amount of existing liquid rheological aids.

The novel coating materials, adhesives, and sealants, especially the novel high-solids clearcoat materials, treated with the novel liquid rheological aids ought to have a particularly high storage stability. Their steadfastness should be particularly high, so that they can be applied without problems at high film thicknesses without any running.

The novel coating materials ought to provide coatings, adhesive layers, and seals having outstanding performance properties. In particular the novel high-solids clearcoat materials ought to provide clearcoats having particularly high film thicknesses which exhibit outstanding leveling, are free from surface defects, such as gel specks, runs, pin holes, orange peel, stress cracks (mudcracking) or craters, and have an outstanding overall appearance, high scratch resistance, high weathering stability, and high condensation resistance.

SUMMARY OF THE INVENTION

The invention accordingly provides the novel liquid rheological aids which comprise
- (A) at least one urea derivative preparable by reacting
  - (a1) at least one compound having at least one isocyanate group with
  - (a2) at least one co-reactant selected from the group consisting of primary and secondary monoamines and polyamines and also water, in the presence
  - (a3) of at least one organobismuth catalyst; and
- (B) at least one additive and which are referred to below as "rheological aids of the invention".

The invention further provides the novel process for preparing liquid rheological aids comprising at least one urea derivative (A) and at least one additive (B), which comprises preparing the urea derivative (A) by reacting at least one compound (a1) having at least one isocyanate group with at least one co-reactant (a2) selected from the group consisting of primary and secondary monoamines and polyamines and also water, in the presence of at least one organobismuth catalyst (a3) in at least one liquid additive (B), and which is referred to below as "process of the invention".

The invention provides not least for the novel use of the rheological aids of the invention and of the liquid rheological aids prepared by means of the process of the invention for preparing novel coating materials, adhesives, and sealants, this being referred to below as "use in accordance with the invention".

Further subject matter of the invention will emerge from the description.

In the light of the prior art it was surprising and unforeseeable for the skilled worker that the object on which the present invention was based could be achieved by means of the rheological aids of the invention, the process of the invention, and the use in accordance with the invention.

In particular it was surprising that, even with a urea derivatives content of more than 10% by weight, based on a rheological aid of the invention, the rheological aids of the invention were easy to prepare, were fluid, and were easy to process.

Using the rheological aids of the invention it was possible to treat larger amounts of coating materials, adhesives, and sealants, especially of high-solids clearcoat materials, than with the same amount of existing liquid rheological aids.

The coating materials, adhesives, and sealants of the invention treated with the rheological aids of the invention, and particularly the high-solids clearcoat materials of the invention, had a particularly high storage stability. Their steadfastness was particularly high, allowing them to be applied without problems at high film thicknesses without any running.

The coating materials, adhesives and sealants of the invention gave coatings, adhesive layers, and seals of the invention having outstanding performance properties. The novel high-solids clearcoat materials in particular gave clearcoats having particularly high film thicknesses, with outstanding leveling, which were free from surface defects, such as runs, pinholes, orange peel, stress cracks (mudcracking) or craters and had an outstanding overall appearance, high scratch resistance, high weathering stability, and high condensation resistance.

DETAIL DESCRIPTION OF THE PREFERRED EMBODIMENTS

The rheological aids of the invention comprise at least one, especially one, urea derivative (A). The urea derivative (A) is preferably solid. It can be amorphous, partly crystalline or partly amorphous, or crystalline. Preferably it is crystalline. With particular preference the crystalline urea derivative (A) is acicular. With very particular preference the crystalline urea derivative (A) is acicular with a full or partial helical twist. In particular the urea derivative crystals (A) have a particle size of from 0.1 to 6 µm. Specifically 80% of the urea derivative crystals (A) are <2 µm.

The urea derivatives are preparable by reacting
(a1) at least one compound having at least one isocyanate group and preferably at least two, especially two, isocyanate groups with
(a2) at least one co-reactant selected from the group, consisting of primary and secondary monoamines, preferably primary monoamines; primary and secondary polyamines, preferably primary diamines; and water; in particular consisting of primary amines and primary diamines.

Examples of suitable compounds (a1) are known from German patent applications
DE 100 42 152 A 1, page 4, para. [0037], to page 6, para. [0063], and
DE 101 26 647 A 1, page 3, para. [0025], to page 6, para [0053].

Examples of suitable co-reactants (a2) are likewise known from German patent applications
DE 100 42 152 A 1, page 4, paragraphs [0034] to [0036], and
DE 101 26 647 A 1, page 2, paragraphs [0021] to [0024].

The compounds (a1) and (a2) are preferably reacted with one another in amounts such that the equivalent ratio of isocyanate groups to amino groups is from 2:1 to 1:2, preferably from 16:1 to 1:1.6 and in particular from 1.2:1 to 1:1.2.

If polyamines and monoamines (a2) are used simultaneously the equivalent ratio of amino groups in the polyamines (a2) to the amino groups in the monoamines (a2) is preferably from 4:1 to 1:2, more preferably from 2:1 to 1:1, and in particular from 1.2:1 to 1:1.

In accordance with the invention the compounds (a1) and (a2) are reacted in the presence of at least one, especially one, organobismuth catalyst (a3).

Suitable catalysts (a3) include in principle all organobismuth compounds which are not decomposed by the compounds (a1) and (a2) or by the additives (B) or which do not catalyze the decomposition thereof. It is preferred to use bismuth compounds (a3) which are soluble in the reaction medium, described below, for the reaction of the compounds (a1) and (a2).

The organobismuth compounds (a3) are preferably selected from the group consisting of bismuth salts of organic carboxylic acids and complexes of bismuth with chelating agents.

Preferred organic carboxylic acids are aliphatic carboxylic acids, more preferably aliphatic monocarboxylic acids, very preferably monocarboxylic acids containing long-chain alkyl groups, preferably long-chain alkyl groups having 6 to 16, in particular 7 to 10, carbon atoms.

The monocarboxylic acids are selected in particular from the group consisting of octanecarboxylic acid, 2-ethylhexanecarboxylic acid, and neodecanecarboxylic acid.

Suitable chelating agents include in principle all organic compounds, especially nonaromatic compounds, which have the capacity to form chelate ligands. These are organic compounds having at least two, especially two, functional groups which are able to coordinate to metal atoms or metal ions. These functional groups are usually electron donors, which donate electrons to metal atoms or metal ions as electron acceptors. The functional groups are preferably carbonyl groups. For further details refer to Römpp Chemie Lexikon, Georg Thieme Verlag, Stuttgart, 1989, Volume 1, page 634. With particular preference the chelating agents are 1,3-diketones. The 1,3-diketones are selected in particular from the group consisting of acetylacetone, ethyl acetoacetate, tetramethylheptanedione, and hexafluoropentanedione, in particular from tetramethylheptanedione and hexafluoropentanedione.

Examples of particularly advantageous organobismuth compounds (a3) are, accordingly, the bismuth salts of octane carboxylic acid, 2-ethylhexylcarboxylic acid, and neodecane carboxylic acid and also the chelate complexes of bismuth with tetramethylheptanedione and hexafluoropentanedione.

The amount of the urea derivatives (A) in the rheological aids of the invention can vary widely. It is a particular advantage of the rheological aids of the invention that they can contain the urea derivatives (A), based on a rheological aid of the invention, in an amount of more than 10% by eight, in particular more than 10 to 20% by weight.

The rheological aids of the invention further comprise at least one additive (B) and in particular at least two additives (B). The additive (B), or at least one of the additives (B), is selected such that the rheological aids of the invention are liquid. The rheological aids of the invention are preferably dispersions, especially suspensions, of the urea derivatives (A) in the additive (B) or in at least one of the additives (B). The additive (B) or at least one of the additives (B) is preferably selected such that it can also serve as the liquid reaction medium for the reaction of the compounds (a1) and (a2) in the presence of the organobismuth compounds (a3).

The additive (B) is selected in particular from the group consisting of pigments, oligomeric and polymeric binders curable physically, thermally and/or with actinic radiation, crosslinking agents curable thermally or both thermally and with actinic radiation, reactive diluents curable thermally and/or with actinic radiation, organic solvents, UV absorbers, light stabilizers, free-radical scavengers, devolatilizers, slip additives, polymerization inhibitors, defoamers, emulsifiers, wetting agents, dispersants, adhesion promoters, leveling agents, film-forming auxiliaries, flame retardants, siccatives, dryers, antiskinning agents, corrosion inhibitors, waxes, and flatting agents, the selection being made such as to result in liquid reaction media and the rheological aids of the invention.

Examples of suitable additives (B) are known from German patent applications
DE 100 42 152 A 1, page 3, paragraphs [0019] to [0030], page 6, paragraphs [0064] to [0066], and page 7, para. [0071], to page 11, para. [0093], and
DE 101 26 647 A 1, page 6, paragraphs [0055] to [0062] and [0065].

The urea derivatives (A) are prepared preferably by the process of the invention by reacting at least one compound (a1) with at least one co-reactant (a2) in the presence of at least one organobismuth catalyst (a3) in at least one liquid additive (B) as reaction medium. The additive (B) or additives (B) is or are preferably selected such that during the reaction the rheological aids of the invention result directly. Preferred reaction media comprise as additives (B) in particular organic solvents and/or liquid reactive diluents and/or crosslinking agents that are curable thermally and/or with actinic radiation and also, where appropriate, oligomeric and polymeric binders curable physically, thermally and/or with actinic radiation, and/or defoamers, emulsifiers and/or wetting agents and/or dispersants, or consist of such additive. They are preferably employed in amounts such as to result in the above-described amount of urea derivatives (A) in the rheological aids of the invention.

In the process of the invention the weight ratio of compounds (a1) and (a2) to organobismuth compounds (a3) can vary very widely. The organobismuth compounds (a3) are preferably used in an amount which acts catalytically but without inducing any adverse changes in the resultant rheological aids of the invention. The organobismuth compounds (a3) are used more preferably in an amount such that the molar ratio of isocyanate groups (NCO) in the compounds (a1) to bismuth (Bi) is from 300:1 to 20:1, more preferably from 260:1 to 25:1, and in particular from 255:1 to 30:1.

Viewed in terms of its method the process of the invention has no special features but can instead be conducted as described in German patent applications
DE 100 42 152 A 1, page 3, para [0068], and
DE 101 26 647 A 1, page 6, paragraphs [0067] to [0068].

The rheological aids of the invention have a particularly pronounced pseudoplasticity.

The rheological aids of the invention have an extremely broad applicability and in particular are outstandingly suitable for preparing coating materials, adhesives, and sealants. The coating materials, adhesives, and sealants of the invention may be curable physically, thermally, with actinic radiation, or both thermally and with actinic radiation (dual cure).

In addition to the rheological aids of the invention, the coating materials, adhesives, and sealants of the invention may comprise, for example, the constituents detailed in German patent application DE 199 24 171 A 1, page 5, line 47, to page 9, line 32. The coating materials, adhesives, and sealants can be prepared by the process described in the German patent application on page 9, lines 33 to 54 Examples of suitable substrates and coating techniques are likewise described in the German patent application on page 9, line 55, to page 10, line 23. Examples of suitable processes for the thermal cure and the actinic radiation cure are known, for example, from international patent application WO 98/40170, page 17, line 18, to page 19, line 20. For further details refer to German patent application DE 100 42 152 A 1, page 6, para. [0067], to page 12, para [0112].

The pseudoplastic coating materials of the invention are used preferably as clearcoat materials, especially as high-solids clearcoat materials, and/or as color and/or effect coating materials for producing clearcoats and also single-coat and multicoat, color and/or effect, electrically conductive, magnetically shielding and/or fluorescent coatings.

The stability of the pseudoplastic coating materials, adhesives, and sealants of the invention under static and dynamic conditions, especially the ring circuit stability, and the running behavior during application and curing are outstanding.

Accordingly the pseudoplastic coating materials, adhesives, and sealants of the invention are outstandingly suitable for the coating, adhesive bonding, and sealing of bodies of means of transport and parts thereof buildings and parts thereof, doors, windows, furniture, small industrial parts, mechanical, optical, and electronic components, coils, containers, packaging, hollow glassware, and articles of everyday use.

The coatings of the invention produced from the pseudoplastic coating materials of the invention are hard, scratchproof, stable to weathering, and stable to chemicals, and in particular are of an extraordinarily high brightness.

The adhesive layers produced from the pseudoplastic adhesives of the invention durably join a very wide variety of substrates bonded with them. There is no loss in bond strength even under extreme climatic conditions and/or highly fluctuating temperatures.

The seals produced from the pseudoplastic sealants of the invention durably seal the substrates sealed with them, even in the presence of strongly aggressive chemicals.

Accordingly the substrates coated with the coatings of the invention, bonded with the adhesive layers of the invention and/or sealed with the seals of the invention have an extraordinarily long lifetime and a particularly high utility, so making them particularly economic in production and use.

EXAMPLES

Preparation Example 1

The Preparation of the Solution of a Thermally Curable Methacrylate Copolymer

A suitable reactor equipped with a stirrer, two dropping funnels for the monomer mixture and the initiator solution, a nitrogen inlet tube, thermometer, and reflux condenser was charged with 813 parts by weight of an aromatic hydrocarbons fraction having a boiling range of 158-172° C. The solvent was heated to 140° C. After 140° C. had been reached, a monomer mixture of 483 parts by weight of n-butyl methacrylate, 663 parts by weight of styrene, 337 parts by weight of hydroxyethyl methacrylate and 31 parts by weight of methacrylic acid was metered into the reactor at a uniform rate over the course of 4 hours and an initiator solution of 122 parts by weight of t-butyl perethylhexanoate in 46 parts by weight of the above-described aromatic solvent was metered into the reactor at a uniform rate over the course of 4 5 hours. The additions of the monomer mixture and of the initiator solution were commenced simultaneously. After the end of the initiator feed the reaction mixture was held at 140° C. for two hours more and then cooled. The resulting polymer solution had a solids content of 65% by weight, determined in a forced-air oven (1 h at 130° C.). It was diluted with a mixture of methoxypropyl acetate, butylglycol acetate, and butyl acetate to a solids content of 53% by weight. The solution of the methacrylate copolymer was used as the organic medium for preparing the rheological aid.

Example 1

The preparation of a Rheological Aid

A suitable stirred vessel was charged with 69.85 parts by weight of the solution of the methacrylate copolymer from preparation example 1, 8.03 parts by weight of benzylamine and 1.0 part by weight of bismuth octoate and this initial charge was mixed with a dissolver so as to give the mixture 1. In a separate vessel 6.29 parts hexamethylendiisocyanat by weight were mixed with 14.83 parts by weight of butyl acetate. The resulting mixture 2 was metered in to mixture 1 over 4 minutes with vigorous stirring. The resulting rheological aid was stirred for a further 10 minutes. It showed an extremely pronounced pseudoplastic behavior. It was stable on storage and of outstanding processability despite the amount of urea derivative (A) based on the rheological aid, being 14.32% by weight. In view of this large amount it was necessary to use only small amounts of rheological aid to prepare coating materials of pronounced pseudoplasticity.

Example 2

The Preparation of High-Solids Clearcoat Material and of a Multicoat Color Paint System Including a Clearcoat A high-solids clearcoat material was prepared by mixing the following constituents and homogenizing the resulting mixture:

54.5 parts by weight of a conventional methacrylate copolymer (cf. German patent application DE 197 25 188 A 1, page 7, lines 24 to 37, "1.2 Acrylate resin B"),
19.1 parts by weight of a commercial melamine-formaldehyde resin (Luwipal® 018 from BASF Aktiengesellschaft),
2.0 parts by weight of butyldiglycol,
1.0 part by weight of a commercial, amine-blocked sulfonic acid (Nacure® 2500 from King Industries),
7.6 parts by weight of methoxypropanol,
4.6 parts by weight of ethyl ethoxypropionate,
0.7 part by weight of a commercial light stabilizer (Tinuvin® 384 from Ciba Specialty Chemicals),
0.6 part by weight of a further commercial light stabilizer (Tinuvin® 292 from Ciba Specialty Chemicals),
0.3 part by weight of a commercial additive (Byk® 390 from Byk Chemie),
0.2 part by weight of a further commercial additive (Byk® 325 from Byk Chemie),
4.8 parts by weight of butyl acetate, and
4.6 parts by weight of the rheological aid according to Example 1.

The high-solids clearcoat material was completely stable under static and dynamic conditions, especially under dynamic conditions in the ring circuits of coating plants. It had a pronounced pseudoplastic behavior and at the same time was very easy to process. In particular it could be applied outstandingly by spray application, and gave high film thicknesses without any running.

A multicoat color paint system including a clearcoat produced from the high-solids clearcoat material was produced using conventional, electrocoated steel test panels. The steel test panels were initially coated with a commercial, aqueous, black surfacer from BASF Coatings AG and after flash-off were coated wet-on-wet with a commercial, black aqueous basecoat material from BASF Coatings AG. Finally, after flash-off, the high-solids clearcoat material was applied wet-on-wet, after which the three films were baked together at 130° C. for 45 minutes.

The resultant clearcoat was brilliant, of high gloss, with a high distinctiveness of image (DOI), was scratchproof, stable to weathering, resistant to etching, highly stable to yellowing, and resistant to condensation. It showed outstanding leveling and was free from surface defects, such as gel specks, runs, pinholes, orange peel, stress cracks (mudcracking) or craters. All in all it had an outstanding overall appearance.

What is claimed is:

1. A liquid rheological aid for use in an automotive OEM high solids clearcoat, the rheological aid comprising
   (A) at least one urea derivative made by the process of reacting
      (a1) at least one compound having at least one isocyanate group with
      (a2) at least one co-reactant selected from the group consisting of primary monoamines, primary polyamines, secondary monoamines, secondary polyamines, water, and a combination thereof, in the presence of
  (a3) at least one organobismuth catalyst; and
B) at least one additive, wherein the selection is made such as to result in a liquid reaction medium in which the organobismuth catalyst is soluble;
wherein the rheological aid comprises a bismuth compound; and
wherein the rheological aid comprises the urea derivative from the reaction of (a1) and (a2) in an amount, based on the rheological aid, of more than 10% by weight and wherein the liquid rheological aid is fluid and capable of use as a thixotropic agent in making an automotive OEM high solids clearcoat having high storage stability, wherein the clearcoat is capable of being applied by spray application.

2. The rheological aid as claimed in claim 1, wherein the organobismuth compound (a3) is selected from the group consisting of bismuth salts of organic carboxylic acids and complexes of bismuth with chelating agents.

3. The rheological aid as claimed in claim 2, wherein the organic carboxylic acids are aliphatic carboxylic acids.

4. The rheological aid as claimed in claim 3, wherein the aliphatic carboxylic acids are monocarboxylic acids.

5. The rheological aid as claimed in claim 4, wherein the long-chain alkyl groups contain 6 to 16 carbon atoms.

6. The rheological aid as claimed in claim 5, wherein the monocarboxylic acids are selected from the group consisting of octanecarboxylic acid, 2-ethylhexanecarboxylic acid, and neodecanecarboxylic acid.

7. The rheological aid as claimed in claim 2, wherein the chelating agents are nonaromatic compounds.

8. The rheological aid as claimed in claim 7, wherein the chelating agents contain at least two functional groups capable of coordination to metal atoms or metal ions.

9. The rheological aid as claimed in claim 8, wherein the functional groups are electron donors.

10. The rheological aid of claim 8, wherein functional groups capable of coordination to metal atoms or metal ions are carbonyl groups.

11. The rheological aid as claimed in claim 10, wherein the chelating agents are 1,3-diketones.

12. The rheological aid as claimed in claim 11, wherein the diketones are selected from the group consisting of acetylacetone, ethyl acetoacetate, tetramethylheptanedione, and hexafluoropentanedione.

13. The rheological aid as claimed in claim 1, wherein the molar ratio of isocyanate groups (NCO) in the compounds (a1) to bismuth (Bi) in the organobismuth compounds (a3) is from 300:1 to 20:1.

14. The rheological aid as claimed in claim 13, wherein the NCO:Bi molar ratio is from 260:1 to 25:1.

15. The rheological aid as claimed in claim 1, comprising the urea derivative (A) in an amount, based on the rheological aid, of more than 10 to 20% by weight.

16. The rheological aid as claimed in claim 1, wherein the urea derivative (A) is crystalline.

17. The rheological aid as claimed in claim 16, wherein the urea derivative crystals (A) are acicular with a full or partial helical twist.

18. The rheological aid as claimed in claim 16, wherein the urea derivative crystals (A) have a particle size of from 0.1 to 6 µm.

19. The rheological aid as claimed in claim 18, wherein 80% of the urea derivative crystals (A) are <2 µm.

20. The rheological aid as claimed in claim 1, wherein the additive (B) is selected from the group consisting of pigments, oligomeric and polymeric binders curable physically or thermally, crosslinking agents curable thermally, reactive diluents curable thermally, organic solvents, water, UV absorbers, light stabilizers, free-radical scavengers, devolatilizers, slip additives, polymerization inhibitors, defoamers, emulsifiers, wetting agents, dispersants, adhesion promoters, leveling agents, film-forming auxiliaries, flame retardants, siccatives, dryers, antiskinning agents, corrosion inhibitors, waxes, and flatting agents and mixtures thereof.

21. A process for preparing a liquid rheological aid comprising one derivative (A) and at least one additive (B), as claimed in claim 1, which comprises preparing the urea derivative (A) by reacting at least one compound (a1) having at least one isocyanate group with at least one co-reactant (a2) selected from the group consisting of primary and secondary monoamines and polyamines and water, in the presence of at least one organobismuth catalyst (a3), in at least one liquid additive (B).

22. A liquid rheological aid comprising
  (A) at least one urea derivative prepared by reacting
    (a1) at least one compound having at least one isocyanate group with
    (a2) at least one co-reactant selected from the group consisting of primary monoamines, primary polyamines, secondary monoamines, secondary polyamines, water, and a combination thereof,
    in the presence of
    (a3) a catalyst consisting of an organobismuth catalyst present in an amount such that the molar ratio of isocyanate groups (NCO) in the compounds (a1) to bismuth (Bi) in the organobismuth compounds (a3) is from 300:1 to 20:1; and
  (B) at least one additive,
  wherein the rheological aid comprises a bismuth compound and further wherein the urea derivative from the reaction of (a1) and (a2) is present in the rheological aid in an amount of 14.32 to 20% by weight, based on the rheological aid.

23. The rheological aid as claimed in claim 1, wherein the rheological aid comprises the urea derivative from the reaction of (a1) and (a2) in an amount, based on the rheological aid, of 14.32 to 20% by weight.

24. The rheological aid as claimed in claim 22, wherein said urea derivative (A) is prepared by reacting
  (a1) at least one compound having at least one isocyanate group with
  (a2) at least one co-reactant selected from the group consisting of primary monoamines, primary polyamines, secondary monoamines, secondary polyamines, water, and a combination thereof, in the presence of
  (a3) a catalyst consisting essentially of one or more organobismuth catalysts.

25. The rheological aid as claimed in claim 1, wherein said urea derivative (A) is prepared by reacting
  (a1) at least one compound having at least one isocyanate group with
  (a2) at least one co-reactant selected from the group consisting of primary monoamines, primary polyamines, secondary monoamines, secondary polyamines, water, and a combination thereof, in the presence of
  (a3) a catalyst consisting essentially of one or more organobismuth catalysts.

26. The rheological aid as claimed in claim 1, wherein the additive (B) is selected from the group consisting of oligomeric and polymeric binders curable physically or thermally, crosslinking agents curable thermally, reactive diluents curable thermally, and mixtures thereof.

* * * * *